United States Patent [19]
Harada et al.

[11] Patent Number: 5,264,186
[45] Date of Patent: * Nov. 23, 1993

[54] CATALYTIC CONVERTER FOR USE IN CONTROLLING AUTOMOTIVE EXHAUST EMISSIONS

[75] Inventors: Takashi Harada, Nagoya; Fumio Abe, Handa; Hiroshige Mizuno, Tajimi, all of Japan

[73] Assignee: NGK Insulators, Ltd., Japan

[*] Notice: The portion of the term of this patent subsequent to Nov. 5, 2008 has been disclaimed.

[21] Appl. No.: 581,987

[22] Filed: Sep. 14, 1990

[30] Foreign Application Priority Data

Jun. 29, 1990 [JP] Japan .................. 2-172929

[51] Int. Cl.⁵ .................. B01D 53/36; F01N 3/28
[52] U.S. Cl. .................. 422/171; 422/174; 422/180; 422/190; 422/196; 60/300; 219/552; 55/DIG. 30
[58] Field of Search .................. 422/171, 174, 180, 190, 422/196, 222; 60/300; 219/552; 55/DIG. 30

[56] References Cited

U.S. PATENT DOCUMENTS

| | | |
|---|---|---|
| 3,755,204 | 8/1973 | Sergeys .................. 422/180 X |
| 3,768,982 | 10/1973 | Kitzner et al. . |
| 3,770,389 | 10/1973 | Kitzner et al. . |
| 3,925,252 | 12/1975 | Yabuta et al. .................. 422/177 X |
| 3,956,614 | 5/1976 | Hervert .................. 219/541 |
| 4,023,360 | 5/1977 | Wössner et al. .................. 422/171 X |
| 4,976,929 | 12/1990 | Cornelison et al. .................. 422/174 |
| 5,063,029 | 11/1991 | Mizuno et al. .................. 422/175 |

FOREIGN PATENT DOCUMENTS

2333092 1/1975 Fed. Rep. of Germany .

Primary Examiner—James C. Housel
Assistant Examiner—Jeffrey R. Snay
Attorney, Agent, or Firm—Parkhurst, Wendel & Rossi

[57] ABSTRACT

The catalytic converter includes a first flow passage for an automotive exhaust gas and a second flow passage disposed parallel to the first flow passage to bypass the exhaust gas therethrough. The first flow passage contains a honeycomb heater or a heater catalyst which comprises a honeycomb heater with a catalyst carried thereon. At the beginning of an operation of any engine, the exhaust gas whose temperature is low is caused to flow through the first flow passage. When the temperature of the exhaust gas exceeds a predetermined value, the flow passage is switched from the first passage to the second flow passage.

9 Claims, 3 Drawing Sheets

1

CATALYTIC CONVERTER FOR USE IN CONTROLLING AUTOMOTIVE EXHAUST EMISSIONS

BACKGROUND OF THE INVENTION

1. Field of the Invention

The present invention relates to a catalytic converter suitable for use in controlling automotive exhaust emissions, and a method of controlling automotive exhaust emissions.

2. Description of the Related Art

Catalytic converters for use in controlling automotive exhaust gas must have a predetermined temperature or above when operated so as to make its catalyst do catalytic action. Hence, the catalyst must be heated when the temperature thereof is not sufficiently high, i.e., at the beginning of running of a vehicle.

Such techniques for heating the catalyst have been proposed in, for example, Japanese Utility Model Laid-Open No. 67609/1988. This disclosed technique is a method of operating a catalytic converter comprised of a metal monolithic catalyst disposed upstream of and adjacent to a main ceramic monolithic catalyst. The metal monolithic catalyst comprises an electrically conductible metal substrate with alumina coated thereon However, deterioration of the catalyst such as a monolithic catalyst starts with that located upstream. In the catalytic converter disclosed in Japanese Utility Model Laid-Open No. 67609/1988, the catalytic component in the metal monolith catalyst, which is a preheater disposed upstream of and adjacent to the main monolithic catalyst, therefore deteriorates first, thereby reducing its exhaust gas conversion efficiency when the temperature of the exhaust gas is low. Furthermore, there is a possibility of the metal substrate being corroded.

The present inventors have found out through intensive studies that the aforementioned problems could be solved by causing an exhaust gas whose temperature is low to flow through a preheater and by switching over the flow passage of the exhaust gas from the preheater to a main catalyst when the temperature of the exhaust gas is raised to a predetermined value.

SUMMARY OF THE INVENTION

The present invention provides a catalytic converter suitable for use in controlling an automotive exhaust gas. The catalytic converter comprises a main monolithic catalyst, a first flow passage for the automotive exhaust gas which is disposed upstream of the main monolithic catalyst, and a second flow passage provided upstream of the main monolithic catalyst and parallel to the first flow passage through which the exhaust gas is bypassed. The first flow passage contains a honeycomb heater comprising a honeycomb structure with at least two electrodes provided thereon to supply a current to the honeycomb structure. Furthermore, the first flow passage can contain the honeycomb heater and an light-off catalyst (catalyst for ignition) disposed downstream of the honeycomb heater. The present invention further provides a catalytic converter suitable for use in controlling an automotive exhaust gas. The catalytic converter comprises a first flow passage for the automotive exhaust gas and a second flow passage provided parallel to said first flow passage. The first flow passage contains a honeycomb heater and a light-off catalyst. The light-off catalyst is disposed downstream of the honeycomb heater in the first flow passage. The honeycomb heater comprises a honeycomb structure with at least two electrodes provided thereon to supply a current to the honeycomb structure. The second flow passage contains a main monolithic catalyst.

The present invention further provides a method of controlling an automotive exhaust gas which comprises the steps of providing a first flow passage upstream of a main monolithic catalyst in which a honeycomb heater comprising a honeycomb structure with at least two electrodes provided thereon to supply a current to the honeycomb structure, by providing a second flow passage upstream of the main monolithic catalyst and parallel to the first flow passage through which the exhaust gas is bypassed, by causing the exhaust gas to flow through the first flow passage until a temperature of the exhaust gas reaches a predetermined value after an engine is started, and by switching over the flow passage from the first flow passage to the second flow passage when the temperature of the exhaust gas exceeds the predetermined value. The present invention further provides a method of controlling an automotive exhaust gas which comprises the steps of providing a first flow passage for the automotive exhaust gas in which a light-off catalyst is disposed downstream of a honeycomb heater comprising a honeycomb structure with at least two electrodes provided thereon to supply a current to the honeycomb structure, providing a second flow passage parallel to the first flow passage in which a main monolithic catalyst is disposed, by causing the exhaust gas to flow through the first flow passage until a temperature of the exhaust gas reaches a predetermined value after an engine is started, and by switching over the flow passage from the first flow passage to the second flow passage when the temperature of the exhaust gas exceeds the predetermined value.

Preferably, the honeycomb heater employed in the present invention has slits provided between the electrodes to alter the resistance of the honeycomb heater. In this way, the heating characteristics of the honeycomb heater can be controlled and the honeycomb heater can thus be heated locally or entirely depending on the use.

The honeycomb structure employed in the present invention is preferably manufactured by forming metal powders into a honeycomb configuration and then by sintering the formed honeycomb body.

DETAILED DESCRIPTION OF THE INVENTION

Figure 1:
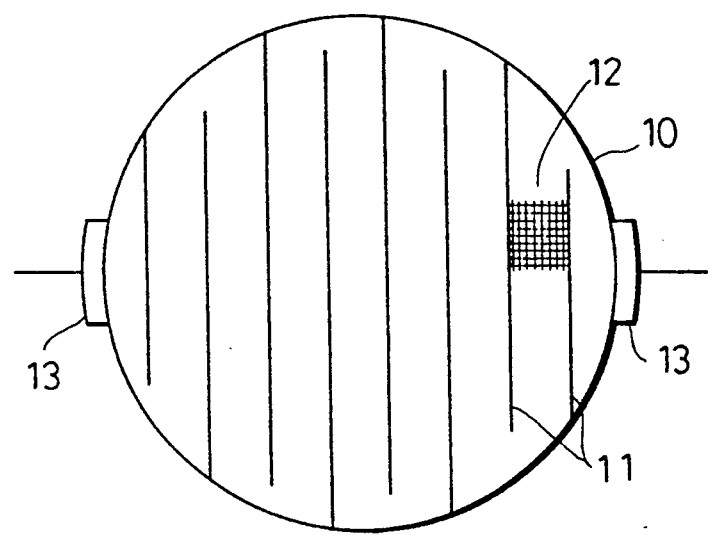
FIG. 1 is a plan view of an example of a honeycomb heater with a catalyst carried thereon, which is employed in the present invention.

In the catalytic converter according to the present invention, a first flow passage for an automotive exhaust gas is provided parallel to a second flow passage through which the exhaust gas is bypassed. The first flow passage contains a honeycomb heater or a heater catalyst which comprises a honeycomb heater with a catalyst carried thereon. At the beginning of the operation of an engine, the exhaust gas whose temperature is low is caused to flow through the first flow passage. When the temperature of the exhaust gas exceeds a predetermined value, the flow passage is switched over from the first flow passage to the second flow passage.

In the above catalytic converter, since the flow passage for the exhaust gas is switched over in accordance with the temperature of the exhaust gas, only the exhaust gas whose temperature is low flows through the honeycomb heater or heater catalyst which serves as a preheater. In consequence, corrosion of the metal substrate of the honeycomb heater or deterioration in the catalyst carried on the heater catalyst, both of which cause reduction in the low-temperature exhaust gas conversion performance, can be suppressed.

Whereas any material, ceramic or metal, capable of generating heat when energized, can be used as the material of the honeycomb structure which is a basic body of the present invention, the use of metal enhances the mechanical strength and is thus preferred. Examples of such metals include stainless steel and materials having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion. The honeycomb structure employed in the present invention may be porous or non-porous. In the case where a catalyst is carried on the honeycomb structure, however, a porous honeycomb structure is preferred because a catalyst layer can closely adhere to such a honeycomb structure, and does not substantially peel from the honeycomb structure even when a difference in the thermal expansion between the honeycomb structure and the catalyst exists.

The metal honeycomb structure will be prepared in the manner described below.

First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion.

Next, the formed honeycomb body is fired in a non-oxidizing atmosphere at a temperature ranging between 1000° and 1450° C. During the sintering in the non-oxidizing atmosphere containing hydrogen, the organic binder is decomposed and thereby removed with the aid of Fe or the like, which acts as a catalyst. A good sintered body (a honeycomb structure) can therefore be obtained.

Sintering at a temperature lower than 1000° C. results in a lack of sintering. Sintering conducted at a temperature higher than 1450° C. causes deformation of the resulting sintered body and, is thus undesirable.

Preferably, a heat-resistant metal oxide layer is then formed on the surface of the cell walls and the surface of the pores of the obtained honeycomb structure.

Next, a resistance mechanism of a desired form is preferably provided on the obtained honeycomb structure between the electrodes thereof, which will be described later.

The resistance mechanism provided on the honeycomb structure may take on any of the following forms:

(1) a slit or slits of any length, formed in any direction at any position
(2) variations in the length of the cell walls in the axial direction of the passages
(3) variations in the thickness (wall thickness) of the cell walls of the honeycomb structure or variations in the cell density of the honeycomb structure, or
(4) a slit or slits formed in the cell wall (rib) of the honeycomb structure.

Electrodes are provided generally on the outer peripheral portion of or inside of the thus-obtained metal honeycomb structure by welding or brazing to manufacture a honeycomb heater.

The term, "electrodes" is used in this application to refer to any terminal through which a voltage is applied to the heater. The electrodes include the direct bonding of the outer peripheral portion of the heater to a can body and terminals for grounding.

In the case of the metal honeycomb structure which is used as a heater, the resistance thereof will be preferably held between 0.001 $\Omega$ and 0.5 $\Omega$.

Preferably, a catalyst is placed on the surface of the thus-obtained metal honeycomb structure so as to attain heat generation due to reaction (oxidation reaction) of the exhaust gas.

The catalyst supported on the surface of the metal honeycomb structure is made of a carrier having a high surface area and a catalyst activating material supported on the carrier. Typical examples of the carriers having a high surface area include $\gamma$-$Al_2O_3$, $TiO_2$, $SiO_2$—$Al_2O_3$ and perovskite. Examples of the catalytic activating material include noble metals such as Pt, Pd and Rh, and base metals, such as Cu, Ni, Cr and Co. The preferred catalyst comprises one in which from 10 to 100 $g/ft^3$ of Pt and/or Pd is loaded on the carrier made of $\gamma$-$Al_2O_3$.

The light-off catalyst disposed at the rear of (downstream of) the honeycomb heater may be of same kind as the catalyst carried on the surface of the metal honeycomb structure or be of same kind as the main monolithic catalyst.

Whereas the honeycomb structure employed in the present invention may have any honeycomb configuration, it is desirable that the cell density ranges from 6 to 1500 $cells/in^2$ (0.9 to 233 $cells/cm^2$) with a wall thickness ranging from 50 to 2000 $\mu$m.

As stated above, the honeycomb structure employed in the present invention may be porous or non-porous. To achieve sufficient mechanical strength and resistance to oxidation and corrosion, however, the porosity of the metal honeycomb structure will preferably be held between 0 and 50% by volume with most preferable porosity being less than 25% by volume. In a metal honeycomb structure designed for use as a substrate for catalyst, the porosity will be held 5% or above to ensure strong adhesion between the honeycomb structure and a catalyst layer.

The term, "honeycomb structure" is employed in this application to refer to an integral body having a large number of passages partitioned by the walls. The passages may have any cross-sectional form (cell shape), e.g., a circular, polygonal or corrugated form.

The present invention will further be illustrated in the following examples which are intended to be illustrative, but not limiting, of this invention.

FIG. 1 is a plan view of an example of a honeycomb heater with a catalyst carried thereon according to the present invention. This honeycomb heater comprises a honeycomb structure 10 with a plurality of slits 11 formed therein as resistance means and with two electrodes 13 provided on the outer wall thereof. The honeycomb structure 10 has a large number of passages 12.

Figure 2:
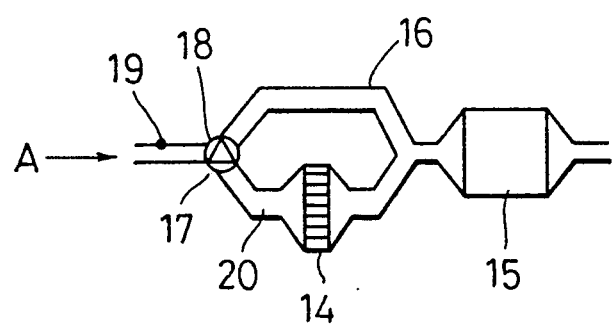
FIGS. 2 to 5 respectively show examples of a catalytic converter suitable for use in controlling automotive exhaust emissions according to the present invention.
Figure 3:
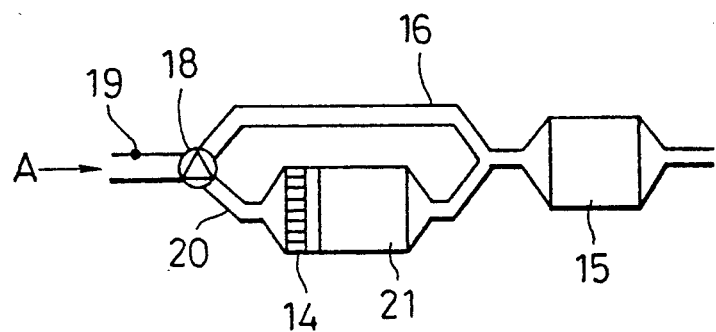
Figure 4:
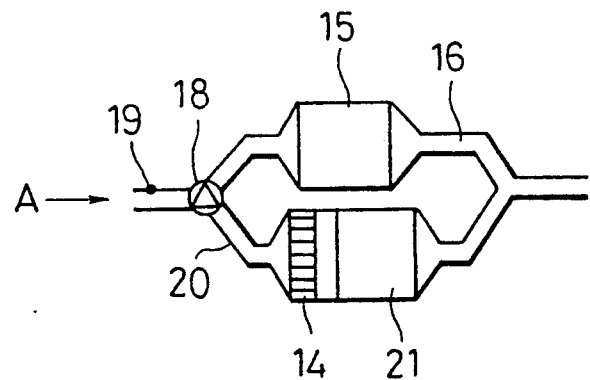

FIGS. 2 to 4 respectively show examples of a catalytic converter suitable for use in controlling automotive exhaust emissions according to the present invention.

FIG. 2 shows a catalytic converter which comprises a main monolithic catalyst 15, a first flow passage 20 for an automotive exhaust gas which is disposed upstream of the main monolithic catalyst 15, and a second flow passage 16 provided upstream of the main monolithic catalyst 15 and parallel to the first flow passage 20 through which the exhaust gas is bypassed. The first flow passage 20 contains a honeycomb heater or a heater catalyst 14 comprising a honeycomb heater with a catalyst carried thereon. In this catalytic converter, until the temperature of the exhaust gas reaches a predetermined value, e.g., 350° C., after the engine is started, the exhaust gas whose temperature is low is caused to flow through the first flow passage 20, by which the exhaust gas is heated by the honeycomb heater or heater catalyst 14. The heated exhaust gas then flows through the main monolithic catalyst 15 by which the main monolithic catalyst 15 is heated and thus activated. When the temperature of the exhaust gas exceeds the predetermined value, e.g., 350° C., the exhaust gas flow is switched by operating a switch-over valve 18 to bypass the flow through the second flow passage 16. In consequence, corrosion of the metal substrate of the honeycomb heater or the heater catalyst 14 or deterioration in the catalyst can be suppressed to a minimum.

FIG. 3 shows a catalytic converter in which an light-off catalyst 21 is disposed downstream of and adjacent to the honeycomb heater or heater catalyst 14.

FIG. 4 shows a catalytic converter in which the light-off catalyst 21 is disposed downstream of and adjacent to the honeycomb heater or heater catalyst 14 and in which the main monolithic catalyst 15 is disposed within the second flow passage 16.

Figure 5:
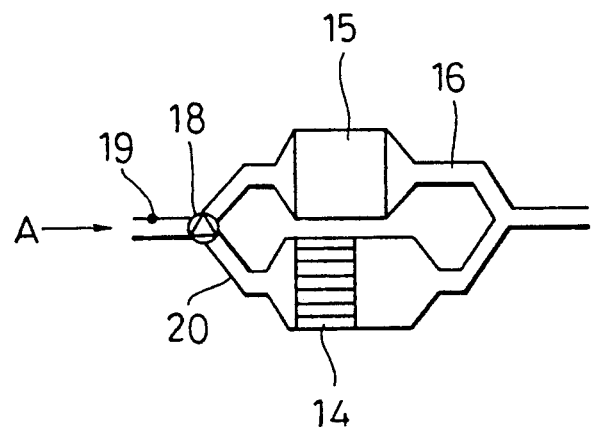

FIG. 5 shows a catalytic converter in which the first flow passage 20 contains the enlarged heater catalyst 14 for ignition.

EXAMPLE

Fe powder, Fe-Cr powder and Fe-Al powder were mixed to prepare a mixture having a composition of Fe-20Cr-5Al (% by weight). The obtained mixture was then formed by the extrusion into a honeycomb body. The formed honeycomb body was sintered in $H_2$ atmosphere to obtain a honeycomb structure having an outer diameter of 93 mm$\phi$, a thickness of 15 mm, a cell wall (rib) thickness of 8 mil and a cell density of 300 cells/in$^2$. Thereafter, eight slits 11, six of which had a length of about 70 mm while two of them located at the two sides had a length of about 50 mm, were formed in the obtained honeycomb structure 10 in the axial direction of passages 12 thereof, as shown in FIG. 1, in such a manner that they were separated from each other by a distance corresponding to seven cells (about 10 mm).

A layer of $\gamma$-alumina was coated on the honeycomb structure 10. Thereafter, 20 g/ft$^3$ of Pd and Pt were respectively loaded on the coated layer. The whole structure was then sintered at 600° C. to generate a catalyst. Subsequently, two electrodes 13 were provided on the outer wall of the obtained honeycomb structure 10, as shown in FIG. 1, to make it a heater catalyst 14.

The obtained heater catalyst 14 was incorporated in the catalytic converter within the first flow passage 20 disposed in front of (upstream of) the three-way catalyst which was the main monolithic catalyst 15, as shown in FIG. 2. This catalytic converter further included the bypassing flow passage 16 through which a high-temperature exhaust gas flows, the change-over valve 18 at a bifurcated portion 17, and a temperature sensor 19 upstream of the change-over valve 18. When the temperature of the exhaust gas reached a high value (e.g., 350° C.), the flow of the exhaust gas was controlled such that it did not flow through the heater catalyst 14 by operating the change-over valve 18.

The performance of the catalytic converter system at the beginning of the operation of an engine was tested by introducing into the system an exhaust gas whose temperature was raised at a same rate from 100° C. to 420° C. for two minutes and was then maintained at 420° C. for one minute (the warming-up test) and by measuring the conversion for CO, HC and NOx. Until the temperature of the exhaust gas reached 350° C., the exhaust gas was introduced into the first flow passage 20. When the temperature exceeded 350° C., the valve 18 was operated to introduce the exhaust gas into the main monolithic catalyst 15. At the beginning of the test, the heater catalyst was energized for one minute by a battery of 12 V in order to heat the exhaust gas to 350° C.

Next, the durability test was conducted on the above system in the manner described below: the temperature of the exhaust gas was raised from the room temperatures to 750° C., and then maintained at 750° C. for ten hours. While the temperature was maintained at 750° C., a cyclic operation was repeated in which the engine was cruised for 60 seconds and then introduction of the fuel was cut for 5 seconds.

At the beginning of the durability test, the heater catalyst 14 was energized for one minute in the same manner as that in which it was energized in the above measurements in order to heat the exhaust gas to 350° C.

After this durability test was performed ten times, the warming-up test was conducted and the conversion for CO, HC and NOx was measured.

For comparison, the durability test was conducted in which the valve 18 was not operated and all the exhaust gas was introduced to the heater catalyst 14.

Table 1 shows the average conversion obtained by the system according to the present invention before and after the durability test and that obtained by the comparative example after the durability test.

TABLE 1

| Average conversion (%) (warming-up test) | | | |
|---|---|---|---|
| | CO | HC | NOx |
| Before the durability test | 70 | 54 | 67 |
| After the durability test (The present invention) | 61 | 48 | 60 |
| After the durability test (Comparative example) | 48 | 41 | 46 |

As will be understood from the foregoing description, in the catalytic converter according to the present invention, since the flow passage for the exhaust gas is switched over in accordance with the temperature of the exhaust gas, only the exhaust gas whose temperature is low flows through the honeycomb heater or heater catalyst which serves as a preheater. In consequence, corrosion of the metal substrate of the honeycomb heater or deterioration in the catalyst carried on the heater catalyst, both of which cause reduction in the low-temperature exhaust gas conversion performance, can be suppressed.

What is claimed is:

1. A catalytic converter for fluid to be flowed therethrough, comprising:
   a main monolithic catalyst capable of being disposed in a stream of exhaust gas;
   a first flow passage for said exhaust gas disposed upstream of said main monolithic catalyst, said first flow passage containing a honeycomb heater comprising:
   a) an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
   b) at least two electrodes in electrical contact with said honeycomb structure;
   c) wherein said at least one slit is disposed between said electrodes thereby modifying the electrical resistance of portions of said honeycomb structure between said electrodes for heating said honeycomb structure and exhaust gas flowing through said passages; and
   a second flow passage for bypassing said exhaust gas from said first flow passage, wherein said second flow passage is disposed upstream of said main monolithic catalyst and is substantially parallel to said first flow passage.

2. A catalytic converter of claim 1, wherein said honeycomb structure has a catalyst carried thereon.

3. A catalytic converter of claim 1, wherein said honeycomb structure is manufactured by forming metal powders into a formed honeycomb body and sintering said formed honeycomb body.

4. A catalytic converter for a fluid to be flowed therethrough, comprising:
   a main monolithic catalyst capable of being disposed in a stream of exhaust gas;
   a first flow passage for automotive exhaust gas disposed upstream of said main monolithic catalyst, said first flow passage containing a honeycomb heater and a light-off catalyst, said light-off catalyst disposed downstream of said honeycomb heater, said honeycomb heater comprising:
   a) an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
   b) at least two electrodes in electrical contact with said honeycomb structure;
   c) wherein said at least one slit is disposed between said electrodes thereby modifying the electrical resistance of portions of said honeycomb structure between said electrodes for heating said honeycomb structure and exhaust gas flowing through said passages; and
   a second flow passage for bypassing said exhaust gas from said first flow passage, wherein said second flow passage is disposed upstream of said main monolithic catalyst and is substantially parallel to said first flow passage.

5. A catalytic converter of claim 4, wherein said honeycomb structure has a catalyst carried thereon.

6. A catalytic converter of claim 4, wherein said honeycomb structure is manufactured by forming metal powders into a formed honeycomb body and sintering said formed honeycomb body.

7. A catalytic converter for fluid to be flowed therethrough, comprising:
   a first flow passage capable of being disposed in a stream of exhaust gas containing a honeycomb heater and a light-off catalyst disposed downstream of said honeycomb heater, said honeycomb heater comprising:
   a) an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
   b) at least two electrodes in electrical contact with said honeycomb structure;
   c) wherein said at least one slit is disposed between said electrodes thereby modifying the electrical resistance of portions of said honeycomb structure between said electrodes for heating said honeycomb structure and exhaust gas flowing through said passages; and
   a second flow passage for bypassing said exhaust gas from said first flow passage, wherein said second flow passage contains a main monolithic catalyst and is substantially parallel to said first flow passage.

8. A catalytic converter of claim 7, wherein said honeycomb structure has a catalyst carried thereon.

9. A catalytic converter of claim 7, wherein said honeycomb structure is manufactured by forming metal powders into a formed honeycomb body and sintering said formed honeycomb body.

* * * * *